United States Patent

[11] 3,589,477

[72] Inventor  Nils Borje Lennart Sander
              Malmo, Sweden
[21] Appl. No. 777,357
[22] Filed     Nov. 20, 1968
[45] Patented  June 29, 1971
[73] Assignee  Svenska Aktiebolaget Bromsregulator
              Malmo, Sweden
[32] Priority  Nov. 23, 1967
[33]           Great Britain
[31]           53,380/67

[54] SLACK ADJUSTING VEHICLE BRAKE APPARATUS
     2 Claims, 1 Drawing Fig.
[52] U.S. Cl. .................................... 188/196,
                                                 188/202
[51] Int. Cl. ..................................... F16d 65/66
[50] Field of Search ........................... 188/196,
                                                 198—203

[56]              References Cited
              UNITED STATES PATENTS
3,285,375  11/1966  Jeppsson et al. ............. 188/196 (PRR)
3,338,356   8/1967  Sobol et al. ................. 188/196 (PRR)
3,401,775   9/1968  Sobol et al. ................. 188/196 (PRR)
3,482,662  12/1969  Bruhn et al. ................. 188/203 (S) X Primary Examiner—Duane A. Reger
Attorney—Laurence R. Brown ABSTRACT: A vehicle automatic slack adjuster has a feeder nut rotatable on a threaded spindle which has axial teeth engaging a movable control member clutch surface to prevent rotation when brakes are released. A stop engages the control member to release the clutch and thereafter to move it into position to compress a spring transmitting a force to the nut to cause rotation during brake application when slack occurs thereby to effect slack adjustment automatically.

PATENTED JUN29 1971 3,589,477
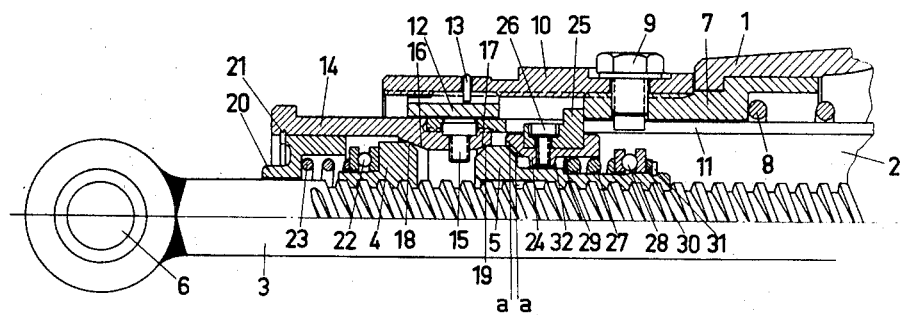
INVENTOR
Nils Borje Lennart Sander
BY Laurence R. Brown
ATTORNEY

SLACK ADJUSTING VEHICLE BRAKE APPARATUS

This invention relates to a vehicle pneumatic brake apparatus with automatic slack adjusting means and more particularly to the kind comprising a piston in a brake cylinder which supports automatic slack-adjusting means including a telescopically-adjustable axially-moving piston rod having a screw-threaded spindle with nonself-locking threads on which two nuts are rotatable to vary the effective length of the piston rod and thereby effect slack-adjustment, with a stop secured to the cylinder for terminating the axial movement of one of said nuts (herein called the "feeding nut") when the movement of the piston rod exceeds a predetermined limit during a brake-applying operation.

A brake apparatus of the kind referred to is often used on a motor-powered vehicle and is exposed to heavy vibrations which could reduce the locking effect of the said two nuts and endanger the maintenance of the desired relative axial position of the piston rod parts.

One object of the present invention is to provide for an improved locking of the piston rod parts in their correct relative axial positions holding them in the presence of heavy vibrations.

According to the invention a brake apparatus of this kind referred to is characterized in that an axially movable control member is arranged to engage said stop and also to engage a spring-support of a prestressed spring on the feeding nut for terminating the axial movement of the feeding nut when the movement of the piston rod exceeds the said predetermined limit during a brake-applying operation, and that when the brake is released the control member engages a fixed abutment and also engages and retains the feeding nut be means of axially-overlapping teeth provided respectively on the control member and the feeding nut and in this position the axial distance between the control member and said spring-support exceeds the axial overlap of said teeth so that during a brake-applying operation the teeth on the feeding nut become clear of the teeth on the control member before the latter engages said spring-support. Preferably said spring is a compression spring which at its one end acts through an antifriction bearing for transmitting the spring force to the feeding nut and which at its other end acts to urge said spring-support against an abutment on the feeding nut, the latter being axially movable on the feeding nut.

The invention is illustrated by way of example in the accompanying drawing which shows partly in vertical section the relevant parts of an apparatus embodying the invention in the brake-released position.

The illustrated apparatus comprises a front airbrake cylinder cover part 1 adapted to guide a telescopically-adjustable axially-moving piston rod having a tubular part 2 and a screw-threaded spindle 3 carrying two nuts 4 and 5. The screw threads of the spindle 3 and the nuts 4 and 5 are of such pitch as to be nonself-locking. For explanation purposes hereinafter the nut 4 will be called the locking nut 4 and the nut 5 will be called the feeding nut 5. The spindle 3 is provided with an eye 6 for connection to the brake-rigging.

The front cover part 1 of the brake cylinder is provided with a sleeve 7 which forms an abutment shoulder for a piston return compression spring 8 and also guides the tubular part 2. A bolt 9 is secured to said sleeve 7 and to an extension part 10 of said sleeve. The bolt 9 protrudes into a longitudinally extending slot 11 in the tubular part 2 so as to prevent rotation of part 2 relative to the sleeve 7. A stop ring 12 is screwed into the extension part 10 and secured by a pin 13.

At the front end of the tubular part 2 is a part 14 screwed on to the tubular part 2 and secured by a bolt 15. The said part 14 is provided with an inwardly extending annular portion having a forwardly directed conical shoulder 16 and a rearwardly directed conical shoulder 17. The shoulder 16 is adapted to engage a rear edge 18 of the locking nut 4, and the shoulder 17 is adapted to engage a front edge 19 of the feeding nut 5. A sleeve 20 is inserted at the front end of the part 14 and retained by a spring clip ring 21. A ball bearing 22 and a compression spring 23 are located between the locking nut 4 and the sleeve 20.

A control member or locking ring for the feeding nut 5 is formed by a ring 24 loosely surrounding the feeding nut 5, the said ring 24 carrying an outwardly extending part 25 secured to the ring 24 by a bolt 26. The part 25 extends through the slot 11 in the tubular part 2, and its front surface is adapted to engage the rear surface of the stop ring 12.

The front end surface of the ring 24 is provided with teeth adapted to engage with and axially overlap corresponding teeth provided on the feeding nut 5, thus forming a clutch a-a.

On the feeding nut 5 a prestressed compression spring 27 and a ball bearing 28 are located between two spring-supports 29 and 30 and retained by a spring clip ring 31 on said feeding nut 5. In the illustrated brake-released position the spring-support 29 has an axial distance from the adjacent surface 32 of the ring 24 which is slightly greater than the axial overlap of the teeth in the coupling a-a.

The illustrated apparatus operates as follows:

During a brake-applying operation the piston rod tubular part 2 is expelled towards the left—in the forward direction—by a piston (not shown in the drawing) by which the return spring 8 is further compressed. The braking force is transmitted to the piston rod spindle 3 through the shoulder 16 and the locking nut 4.

The nut 5 will usually move equally with the axial movement of the spindle 3, but if the axial movement of the piston rod tubular part 2 becomes longer than desirable—for example because of worn brake blocks (not shown) or other causes of undue slackness in the brake rigging—the outwardly extending part 25 of the control member will engage the stop 12. The feeding nut 5 will continue its forward movement and thus the teeth on the feeding nut 5 will become clear of the teeth on the control member ring 24, that is to say the clutch a-a will open. After a small further travel in the forward direction of the nut 5 the surface 32 will engage the spring-abutment ring 29 the latter being axially movable on the feeding nut 5 and pressed by the prestressed compression spring 27 against an abutment constituted by a shoulder on the feeding nut 5. During a further forward travel of the spindle 3 the feeding nut 5 will be retained in its axial position relative to the cylinder 1 by means of the control member ring 24, ring 29, spring 27, bearing 28, ring 30, spring clip ring 31, while rotating on the spindle 3. Simultaneously the axial distance between the edge 19 and the surface 17 will increase, corresponding to the further travel of the spindle 3—the increase of said axial distance corresponding to the amount of the excessive slack in the rigging.

During the release of the brakes the piston return spring 8 will move the tubular parts 2 and 14 towards the right—in the rearward direction. The locking nut 4 will remain in contact with the surface 16 of the part 14 and thus the spindle 3 will move equally rearward. The feeding nut 5 will also move equally rearward with the spindle 3, and as soon as the teeth on the nut 5 overlap those on the control member 24, 25, the clutch a-a will be engaged and the control member 24, 25 will participate in the rearward axial movement of the spindle 3.

However, towards the end of the brake release piston stroke the part 25 of the control member 24, 25 will contact the front end of the sleeve 7 as shown in the drawing, and thus further axial movements of the feeding nut 5 will cease. At this moment there is still an axial distance between the edge 19 of the nut 5 and the surface 17. The movement of the tubular part 2 rearward towards the right will continue, but the resistance against such movement offered by the brake rigging to which the spindle 3 is connected will increase and cause a compression of the spring 23 and a gap between the edge 18 of the locking nut 4 and the adjacent surface 16. Now the spindle 3 will remain stationary and the locking nut 4 will move axially rearward along the spindle 3 while rotating thereon. This axial travel of the nut 4 on the spindle 3 will continue until the edge 18 engages the surface 16 and the surface 17 contacts the edge 19 of the feeding nut 5. As a result the two nuts 4 and 5 will have made equal axial rearward movements on the spindle 3 corresponding to the amount of excessive slack which previously existed in the rigging but is now thus eliminated.

From the above description it will be seen that the illustrated apparatus comprises a piston in a brake cylinder 1 which also supports automatic slack-adjusting means including the telescopically-adjustable piston rod having the tubular part 2 and the screw-threaded spindle 3 with nonself-locking threads on which the two nuts 4 and 5 are rotatable to vary the effective length of the piston rod and thereby effect slack-adjustment, with the stop ring 12 secured through the part 10 to the cylinder 1 for terminating the axial movement of the feeding nut 5 when the movement of the piston rod exceeds a predetermined limit during a brake-applying operation. The axially movable control member 24, 25, 26, is arranged to engage the said stop ring 12 and also to engage the spring-support ring 29 of the prestressed spring 27 on the feeding nut 5 when the movement of the piston rod exceeds the said predetermined limit during a brake-applying operation. When the brake is released the control member 24, 25, 26 engages a fixed abutment constituted by the sleeve 7, and also engages and retains the feeding nut 5 by means of the axially-overlapping oblique teeth provided respectively on the control member ring 24 and the feeding nut 25, and in this position the axial distance between the control member ring 24 and the spring-support ring 29 exceeds the axial overlap of the said teeth so that during a brake-applying operation the teeth on the feeding nut 5 become clear of the teeth on the control member ring 24 before the latter engages the spring-support ring 29.

In the above-described apparatus, however, engagement of the axially-overlapping oblique teeth positively prevents any inadvertent rotation of the feeding nut even when subjected to severe vibration.

What I claim is:

1. In vehicle brake apparatus of the type comprising a brake cylinder enclosing automatic slack-adjusting means with a telescopically-adjustable axially-moving brake rod having a screw threaded spindle with two nuts being freely rotatable thereon without locking to vary the effective length of the brake rod and thereby effect slack adjustment, the improvement comprising in combination, a stop secured on said cylinder, axially movable control means moving axially within said cylinder into said stop when the brake rod exceeds a predetermined movement limit during a braking operation, a first one of said nuts comprising a feeding nut having axially overlapping clutch teeth engaging said control means as a clutch to prevent its rotation when the brake is released and to move away from engagement when the control means engage said stop during a braking operation, and prestressed spring means carried by said feeder nut and arranged to engage and bias said control means only when the feeder nut moves axially a distance greater than the overlap of said clutch teeth so that the clutch is disengaged before said prestressed spring means engages the control means to thereby apply a force to said feeder nut.

2. Apparatus as defined in claim 1 wherein the spring means comprise a compression spring having an antifriction bearing affixed to said feeder nut at one end for transmitting the spring force thereto and axially movable along said feeder nut against an abutment on the nut at its other end.